March 7, 1933. G. M. BELLANCA 1,900,631
AIR BRAKE FOR AIRPLANES
Filed Nov. 8, 1930
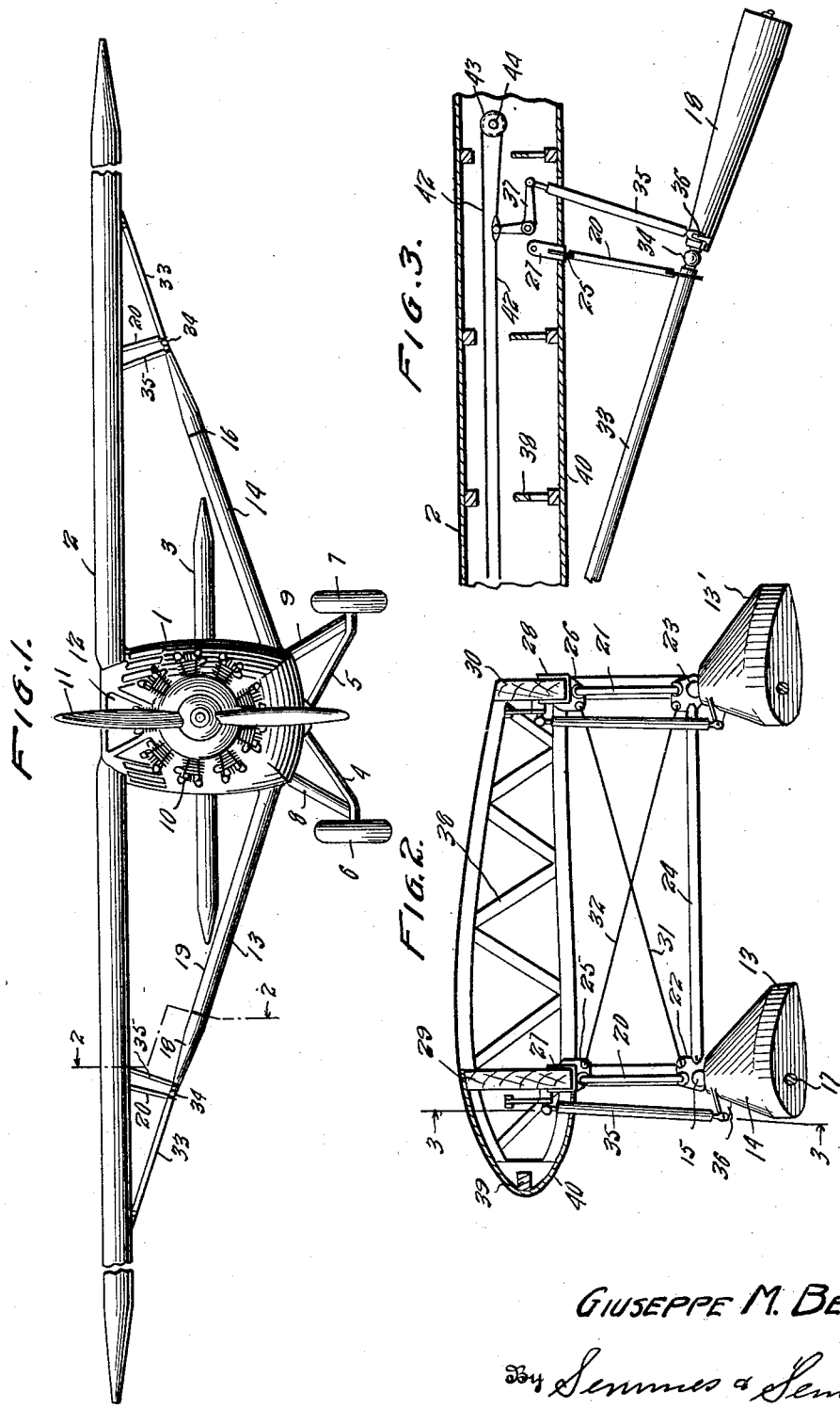
Inventor
GIUSEPPE M. BELLANCA
By Semmes & Semmes
Attorneys Patented Mar. 7, 1933

1,900,631

UNITED STATES PATENT OFFICE

GIUSEPPE M. BELLANCA, OF NEW CASTLE, DELAWARE

AIR BRAKE FOR AIRPLANES

Application filed November 8, 1930. Serial No. 494,362.

This invention relates in general to aircraft, and more particularly has reference to adjustable stabilizing lift struts for retarding the flight of an airplane.

The present application is a continuation in part of my following prior applications— application Serial No. 494,361, filed on the 8th of November, 1930—application Serial No. 494,360, filed on the 8th of November, 1930—application Serial No. 494,365, filed on the 8th of November, 1930. In these applications I have shown an airplane provided with struts to reinforce the mounting of a single wing carried on the fuselage thereof, or to reinforce the mounting between wings, which are adapted to provide as well, additional lift, and increase the lateral and longitudinal stability of an airplane.

In my first application there is described the various types of members used in the past for bracing between the wing and and the fuselage of a monoplane, or between the wing surfaces of other types of planes, which as pointed out therein, have generally been circular in cross section. It is mentioned in this application that in some instances a fairing has been added to produce a streamline section on certain of the larger struts formerly employed. As is pointed out in this application, however, I am not aware that it has ever been contemplated to so design struts of this character as to provide for the same, lending lift in addition to that of the wings when the airplane is in flight, and thus increase the effective lifting surfaces of the airplane.

The former strut constructions have thus been diametrically opposed to those which I contemplate. Previous to this time it has been sought to reduce parasitic resistance in the design of struts of this character, and it is for this reason that the struts have been streamlined in later practices, and the dimensions of the same in cross section kept to the minimum. Until the invention disclosed in my first application, no advantage has been taken of the lifting effect which may be obtained in addition to that afforded by the wings of an airplane in the use of struts constructed as air foils. In the mounting of the struts in particular position with respect to the longitudinal axis of an airplane, I am also enabled to increase the lateral stability of such an airplane in flight as well as obtain an added lifting effect by the struts.

When lift struts are constructed as air foils so as to impart an additional lift to an airplane in flight, by adding to the effective area of the wings, the same may be positioned so as to increase the longitudinal stability and provide for the restoration of the same in flight, as well as the lateral stability of the airplane, and allow for a decrease in the take-off and landing speed of the airplane upon which the same are mounted.

In my second application I have shown the cords of each two pairs of lift struts angularly positioned with respect to each other, and with that of the wing, so that if the plane noses down, the lift on the front strut increases, and that on the back strut decreases, and the reverse if the plane noses up, to restore and maintain longitudinal stability.

The angular positioning of the chords of the struts is also such as to impart a maximum lift with the minimum resistance, and so allow a decrease in the landing and take-off speed, by the increase in the effective wing surfaces, with the least possible sacrifice of air speed, due to the resistance of the struts. In this second application I have shown the lift struts arranged in parallel pairs in tandem, anchored at the top ends on the underside of the wing through a suitable skeleton structure to prevent interference by the struts with air currents passing under the wing.

If the struts are positioned with the chords of the same in the same plane as that of the wing, the maximum lift will be obtained, but a high resistance, retarding the speed of the airplane will be offered in flight. The lateral stability will, nevertheless, be increased due to the opposed forces exerted on each side of the longitudinal axis of the plane. The longitudinal stability will be increased also, if the struts are positioned so as to exert opposed forces on each side of the lateral center of balance.

The struts when thus positioned do not act to restore longitudinal stability, however, and offer resistance retarding the flight of the airplane, although allowing for the maximum decrease in the take-off and landing speed. In my second application I have described each pair of struts as positioned with the chords of the same angularly disposed with respect to that of the wing, and with respect to those of each other, the front strut being given a positive angle of incidence, and the rear strut a negative angle of incidence.

When the struts are thus positioned, the forces exerted on the same tend to maintain lateral stability, and allow for restoration and maintenance of longitudinal stability for, if the plane noses down, the rear strut, having a negative angle of incidence, will lose in lifting effect, while the front strut having a positive angle of incidence will increase in lifting effect tending to bring the longitudinal axis of the plane back to level. The opposite result will obtain if the plane noses up, in the reverse manner. The airplane is thus longitudinally stabilized, restoration of longitudinal stability occurring automatically if the stability is momentarily lost, provided the lateral center of balance does not shift. With the chords of the struts fixedly positioned, however, there must necessarily be a compromise between the decrease allowed in landing and taking-off by positioning the struts for obtaining maximum lift, and the decrease in resistance to afford the top air speed, where the lift of the struts is at the minimum.

In order to obtain the maximum lift of the struts on landing and taking off, and afford the least resistance of the same in flight, I have made the struts movable so as to allow adjustment of the angles of incidences of the same, as shown in my third application. In this manner, the struts may be adjusted for obtaining the maximum lift in taking off and landing, and the angles of incidence changed so that the same offer the least resistance in flight.

The fixed lateral mounting of the struts aids in maintaining the lateral stability of the airplane, and the angles of incidence of the struts may be fixed in flight so that the same tend to restore and maintain longitudinal stability as well. While the setting of the struts with the angles of incidence in a plane to obtain the greatest lift allows for a substantial decrease in the take-off and landing speed due to the increase in the effective wing area, the flight of the airplane on landing is not retarded to the maximum obtainable by certain positioning of the struts.

The primary object of this invention is to construct the lift struts for greater rotation so that the surfaces thereof may be presented to the front in order to retard the flight of an airplane.

Another object of this invention is to provide lift struts capable of being operated to act as air brakes.

Another object of this invention is to provide lift struts normally positioned to restore and maintain the longitudinal stability of an airplane capable of operation to retard the flight of the airplane.

A further object of this invention is to provide lift struts normally positioned to offer a minimum of resistance in flight which may be adjusted to increase the lift and decrease the take-off and landing speed of the airplane, capable of operation to retard the flight of the airplane on landing.

A still further object of this invention is to provide lift struts having portions normally positioned in substantially horizontal planes, capable of movement into vertical planes.

With these and other objects in view, which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

This invention consists in general of wing struts constructed as air foils and mounted on an airplane by anchoring between the wing and the fuselage in the same manner as the struts disclosed in my copending applications, except that portions of the struts are made movable with respect to the other portions, for the primary purpose of adding to the resistance of the airplane so as to retard the flight thereof. The movable portions may be fixedly positioned, however, to present different angles of incidence adapted to maintain the longitudinal stability of the airplane, and to decrease the take-off and landing speed as well as to offer the least resistance in flight, as shown in my copending applications.

In order to make my invention more clearly understood, I have shown in the accompanying drawing, means for carrying the same into practical effect without limiting the improvements in their useful applications to the particular constructions which, for the purpose of explanation, have been made the subject of illustration.

In the drawing:

Figure 1 is a front view of an airplane having the lift and stabilizer strut air brakes mounted thereon.

Figure 2 is a sectional view taken on line 2—2 of Figure 1.

Figure 3 is a sectional view taken on line 3—3 of Figure 2.

Referring more particularly by numerals to the drawing, there is shown in Figure 1 a high-wing cabin monoplane having a fuselage 1 with a wing 2 mounted across and on top of the forward portion thereof. The rear of the fuselage is provided with a conventional tail assembly of which only the horizontal stabilizer 3 is evident. A landing gear, consisting of struts 4 and 5 terminating in the axles on which wheels 6 and 7 are mounted, and braces 8 and 9, is carried on the underside of the fuselage below the forward portion of the wing. A radial motor 10, operating a propeller 11, is mounted in the nose of the fuselage, the upper portion of which is provided with a series of windows 12 to allow vision from the interior.

The mounting of the wing 2 on the fuselage is reinforced by pairs of lift struts 13 and 14, positioned in tandem and parallel. The mounting of the lift struts to the top wing is best shown in Figure 2, wherein the respective struts in the pair are designated as 13 and 13'. The upper ends of the struts are tapered toward the ends at 14, and terminate in ends of decreased dimensions in cross sections, having balls 15 fixed therein.

The upper portions of the lift struts adjacent the tapered ends are divided, as shown in Figure 1 at 16, are connected by rods 17, as shown in Figure 2, which may be formed integral with the balls 15 on the ends. The upper sections of the struts, designated by the numeral 18, are adapted to be moved with respect to the lower portions of the struts designated by the numeral 19 on the rods or axles 17. These rods preferably extend through the upper sections 18, suitably affixed therein to provide relative rotation therebetween, and may terminate integral with the balls 15, carried on the tapered ends thereof. The lower ends of the rods 17 are adapted to fit in longitudinal apertures provided in the lower sections 19 of the struts, and to rotate therein so as to allow relative movement between the upper sections 18 and the lower sections 19.

The lower ends of the struts 14, or lower sections 19, are suitably immovably fixed to the sides of the fuselage adjacent the lower edges thereof. The rod 17 may extend through the lower sections of the struts 13 and be secured in the fuselage to reinforce the mounting of the struts if this is found desirable.

The upper ends of the struts, or upper portions 18, are adapted to be mounted for rotation on a skeleton structure suspended from the wing, the skeleton structure preferably being mounted on the wing spars. The skeleton structure supporting the upper portions 18 of the struts consists essentially, as shown in Figure 2, of uprights 20 and 21 affixed to plates 22 at 23 at the lower ends connected by a cross brace 24, similarly affixed thereto. The tops of the uprights 20 and 21 are affixed to plates 25 and 26 which are connected to angle members 27 and 28. The angle members 27 and 28 are fitted on front and rear spars 29 and 30, making up the wing 2 and suitably affixed thereto. The top and bottom plates of the structure, are connected by cross guy wires 31 and 32. The bottom plates are provided with apertures adapted to receive extension bars 33 having the upper ends suitably anchored in the wing. The lower ends of the bars extend through the apertures in the bottom plates 22 and 23, and terminate in sockets 34 adapted to receive the balls fixed on the upper portions 18 of the struts, and allow rotation thereof relative to the strut portions 19. The skeleton structure for anchoring the upper portions 18 of the struts below the bottom face of the wing is intended to allow passage of air currents under the wing without interference or interruption by the struts.

The upper portions 18 of the struts are adapted to be rotated on the rods 17 by movement of rods 35, connected at the lower ends to arms 36 fixed on the leading edges of the struts adjacent the tapered ends of the upper portions 18. The tops of the rods 35 extend through apertures provided in the bottom face of the wing, and are connected to bell crank levers 37 pivoted on the front face of the spar 29.

The wing 2 may be of any conventional construction, that shown consisting of the longitudinal spars 29 and 30 and transverse ribs 38. The leading edge of the wing is formed of a spar 39 and covered by a nose cap 40. The wing may be surfaced either with fabric or metal, according to the construction of the airplane. In the present mounting of the bell cranks on the spars, the same are operated by a cable 41 connected thereto through a member 42, the cable being connected to the ends of the bell cranks opposite to that at which the rods 35 are pivoted. The cable is carried over pulleys 43 pivoted on pins suitably mounted adjacent the extremities of the wing 2, the cables running into the fuselage where the same are controlled through a suitable operating mechanism.

The operation of this invention will be readily understood. On taking off, the angles of incidence of the struts are preferably set so as to afford the maximum lift obtained thereby. This is accomplished by manipulation of the controls in the fuselage operating the cable so as to rotate the upper portions 18 of the struts by the bell crank levers operating the rods 37 and 35, respectively.

The lower portions of the struts 13, which are fixedly mounted, are either set at the same angles of incidence, or the lower portions of the front struts given a slight positive angle of incidence, and the lower portions of the rear struts a slight negative angle of incidence. In this manner some added degree of lift is afforded on taking off and landing, and longitudinal stability is maintained in flight, in that if the plane noses down the lift of the front struts increases, and that of the rear struts decreases tending to bring the nose up, and the reverse if the plane noses up.

The upper or movable portions of the struts may be operated to afford the maximum lift in taking off and landing, and either positioned in flight to increase the longitudinal stability by setting the forward struts at greater or less positive angles of incidence, and the rear struts at corresponding negative angles of incidence, or positioned to afford the minimum of resistance tending to allow greater speed of the plane to be obtained.

In accordance with the present invention, however, the movable portions are rotated about ninety degrees on landing to present resistance surfaces to retard the flight of the airplane. Actually when approaching a landing, the movable portions of the strut are preferably positioned to afford the maximum lift and a slower speed of the airplane thus allowed by reason of the added effective wing area, and subsequently rotated to present resistance surfaces and retard the flight of the airplane.

There is accomplished by this invention lift struts for an airplane mounted to increase the lateral stability thereof and capable of being positioned to restore and maintain longitudinal stability adapted to be operated to increase the lift of the airplane on landing and taking off, and operated to offer a minimum of resistance in flight, constructed in addition for rotation on landing to present resistance surfaces for retarding the flight of the airplane.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claim.

I claim:

An airplane comprising lift struts, said lift struts being divided into two portions, a rod extending through the lift struts and rotatably mounted within the lower portion and fixedly mounted to and within the upper portion, means to move the rod to produce rotation of the upper portion with respect to the lower portion to retard the speed of the airplane.

In testimony whereof I affix my signature.

GIUSEPPE M. BELLANCA.